J. D. VAN DUSEN.
GRAIN-SEPARATOR.
No. 187,739. Patented Feb. 27, 1877.
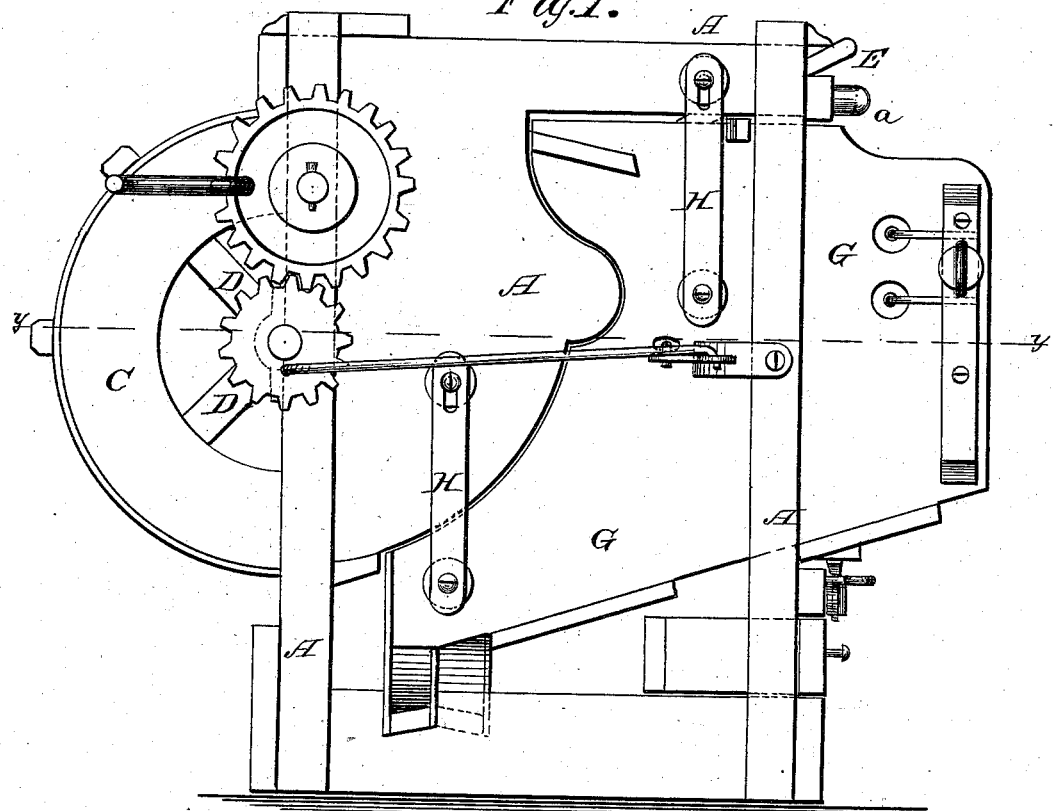
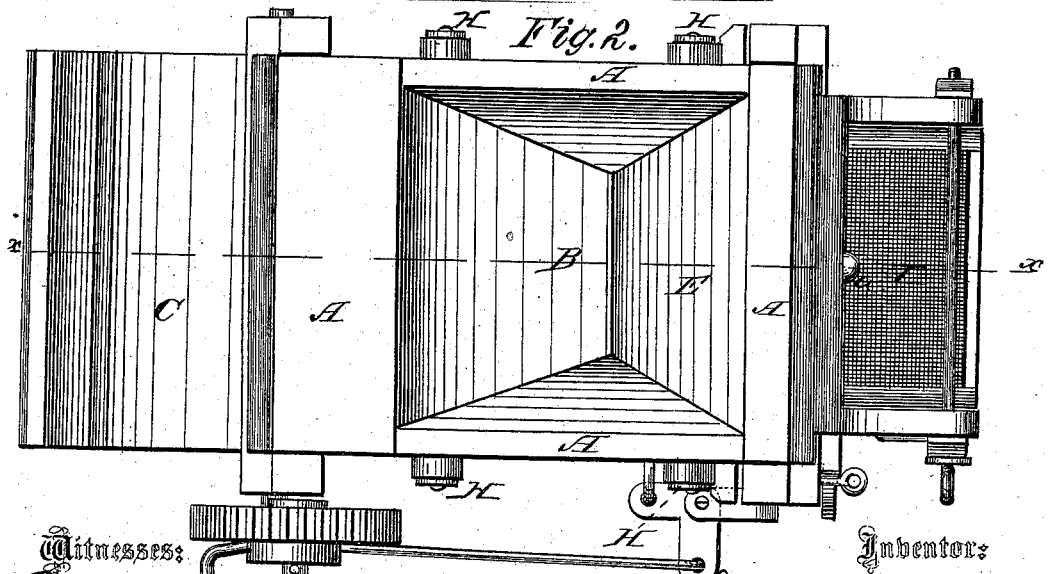

J. D. VAN DUSEN.
GRAIN-SEPARATOR.

No. 187,739. Patented Feb. 27, 1877.

Witnesses:
P. C. Dieterich.
Frank H. Duffy.

Inventor:
John D. Van Dusen
Per: C. H. Watson & Co. Attorneys.

UNITED STATES PATENT OFFICE.

JOHN D. VAN DUSEN, OF AUBURN, NEW YORK.

IMPROVEMENT IN GRAIN-SEPARATORS.

Specification forming part of Letters Patent No. 187,739, dated February 27, 1877; application filed November 2, 1876.

*To all whom it may concern:*

Be it known that I, JOHN D. VAN DUSEN, of Auburn, in the county of Cayuga and State of New York, have invented certain new and useful Improvements in Grain-Separator; and I do hereby declare that the following is a full, clear, and exact description thereof, which will enable others skilled in the art to which it appertains to make and use the same, reference being had to the accompanying drawing, and to the letters of reference marked thereon, which form a part of this specification.

The nature of my invention consists in certain improvements in grain-separators, as will be hereinafter more fully set forth.

Figure 3:
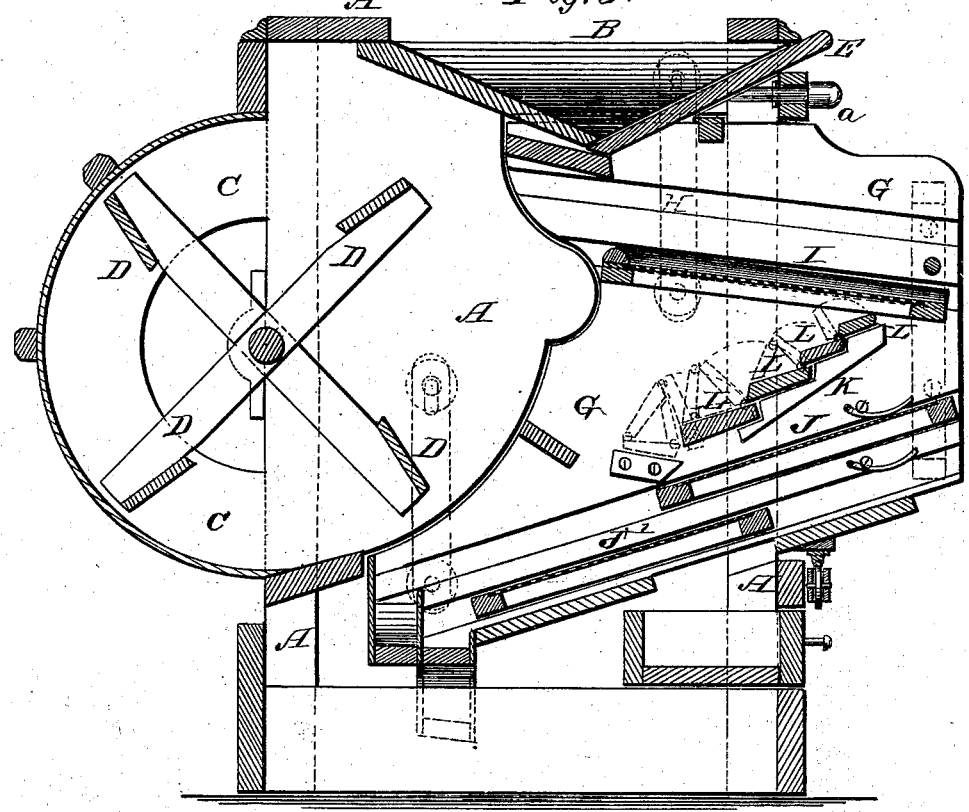
Figure 4:
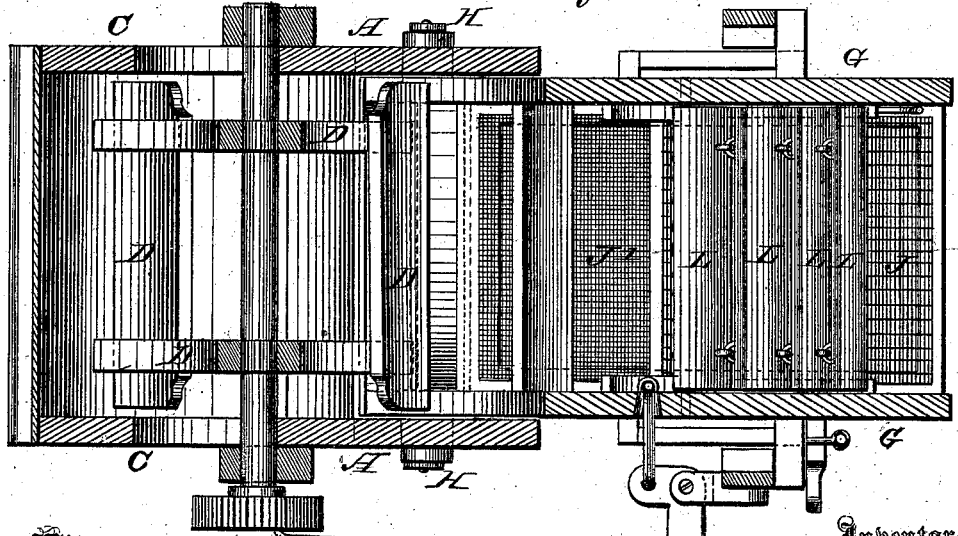

In the annexed drawing, Figure 1 is a side elevation of a grain-separator embodying my invention. Fig. 2 is a plan view of the same. Fig. 3 is a longitudinal vertical section through the line $x$ $x$, Fig. 2. Fig. 4 is a horizontal section through the line $y$ $y$, Fig. 1.

A represents the frame of my grain-separator, with hopper B, fan-case C, and fan D. E is the slide or sliding board of the hopper, which is adjusted to regulate the feed, and is held at any point desired by means of an eccentric locking-pin, $a$, as shown in Fig. 3. G is the shoe, suspended in the frame A by means of flexible metallic straps H H, and containing the top sieves I and bottom sieves J J'. Between the two sets of sieves is an adjustable divider, composed of a series of boards or slats, L L, hinged together and supported upon step-shaped cleats K K, secured to the sides of the shoe G.

By means of this adjustable jointed divider the grain may be separated at any point desired under the screen I, advantage being taken of the gravity of the grain, the heaviest and most perfect grain falling nearly perpendicular from the screens I in the air-current from the fan, while the unsound grain, chaff, &c., will be carried forward and nearer the tail of the mill. The point of division of the two qualities of grain can be changed at will by folding or unfolding the divider, as required.

The sieves J and J' in the lower part of the shoe are so arranged that the grain passes off from one to the other, which makes it much more effective in operation than where the sieves are placed one directly beneath the other, and the grain passes through and onto the one below, each in succession, while some portion passes over.

For instance, in cleaning wheat mixed with chess and cockle, the chess requires a long mesh, while the cockle a square one. Now, by putting the long-mesh sieve J in the top groove of the lower set, and at the outer end of the shoe, and the square-mesh sieve J' in the lowest groove, and passed down to the other end of the shoe, the advantage is gained of screening the grain over both sieves, one after the other, while in mills which have the sieves the full length of the lower shoe, with mesh coarse enough to screen out both of these impurities, there is a great sacrifice of grain in the operation. By arranging the shoe with two sieves in length a greater number of combinations can be made than with sieves one directly beneath the other.

Having thus fully described my invention, what I claim as new, and desire to secure by Letters Patent, is—

The adjustable jointed divider, composed of a series of slats, L L, hinged together so as to be folded and unfolded at will, and arranged between the upper and lower set of sieves in the shoe of a grain-separator, for the purposes herein set forth.

In testimony that I claim the foregoing as my own I affix my signature in presence of two witnesses.

JOHN D. VAN DUSEN.

Witnesses:
 HORACE T. COOK,
 JAS. R. COX.